United States Patent [19]
Kallin et al.

[11] Patent Number: 5,701,585
[45] Date of Patent: Dec. 23, 1997

[54] MOBILE ASSISTED HANDOFF

[75] Inventors: Harald Kallin, Sollentuna; Anna Fallgren, Stockholm, both of Sweden

[73] Assignee: Telefonaktiebolaget LM Ericsson, Stockholm, Sweden

[21] Appl. No.: 354,779

[22] Filed: Dec. 12, 1994

[51] Int. Cl.⁶ .................................................. H04Q 7/20
[52] U.S. Cl. ........................ 455/33.2; 455/33.4; 379/60
[58] Field of Search ............................ 455/33.1, 33.2, 455/33.4, 34.1, 54.1, 56.1, 62, 63; 379/60

[56] References Cited

U.S. PATENT DOCUMENTS

| | | | |
|---|---|---|---|
| 4,144,496 | 3/1979 | Cunningham et al. | 455/33.1 |
| 4,435,840 | 3/1984 | Kojima et al. | 455/33.2 |
| 4,608,711 | 8/1986 | Goldman | 455/33.1 |
| 4,670,899 | 6/1987 | Brody et al. | 379/60 |
| 4,754,453 | 6/1988 | Eizenhöfer | 455/33.1 |
| 4,765,753 | 8/1988 | Schmidt | 379/60 |
| 4,799,252 | 1/1989 | Eizenhöffer et al. | 455/33.1 |
| 4,850,033 | 7/1989 | Eizenhöfer et al. | 455/33.1 |
| 4,955,082 | 9/1990 | Hattori et al. | 455/54.1 |
| 5,042,082 | 8/1991 | Dahlin | 455/33.2 |
| 5,083,304 | 1/1992 | Cahill | 455/239.1 |
| 5,101,501 | 3/1992 | Gilhousen et al. | 455/33.1 |
| 5,428,816 | 6/1995 | Barnett et al. | 455/33.2 |
| 5,432,843 | 7/1995 | Bonta | 455/33.2 |
| 5,450,473 | 9/1995 | Shiotsuki et al. | 455/33.2 |
| 5,517,675 | 5/1996 | O'Connor et al. | 455/33.2 |

FOREIGN PATENT DOCUMENTS

| | | |
|---|---|---|
| 0 126 557 | 11/1984 | European Pat. Off. . |
| 0196722 | 8/1991 | Japan ............... 455/33.4 |

*Primary Examiner*—Reinhard J. Eisenzopf
*Assistant Examiner*—Thanh Le
*Attorney, Agent, or Firm*—Burns, Doane, Swecker & Mathis, L.L.P.

[57] ABSTRACT

Several mobile assisted handoff methods for use in the cellular communication system comprising a plurality of cells are disclosed. First, the quality level of a cell a mobile station is presently using is measured to determine whether the quality level is above or below a threshold. If the quality level is below the threshold, a primary list of cells is assigned to the mobile station, whereas if the quality level is above the threshold, a secondary list of cells is assigned to the mobile station. The quality level of each of the assigned cells is then measured by the mobile station and reported to the communication system.

25 Claims, 4 Drawing Sheets

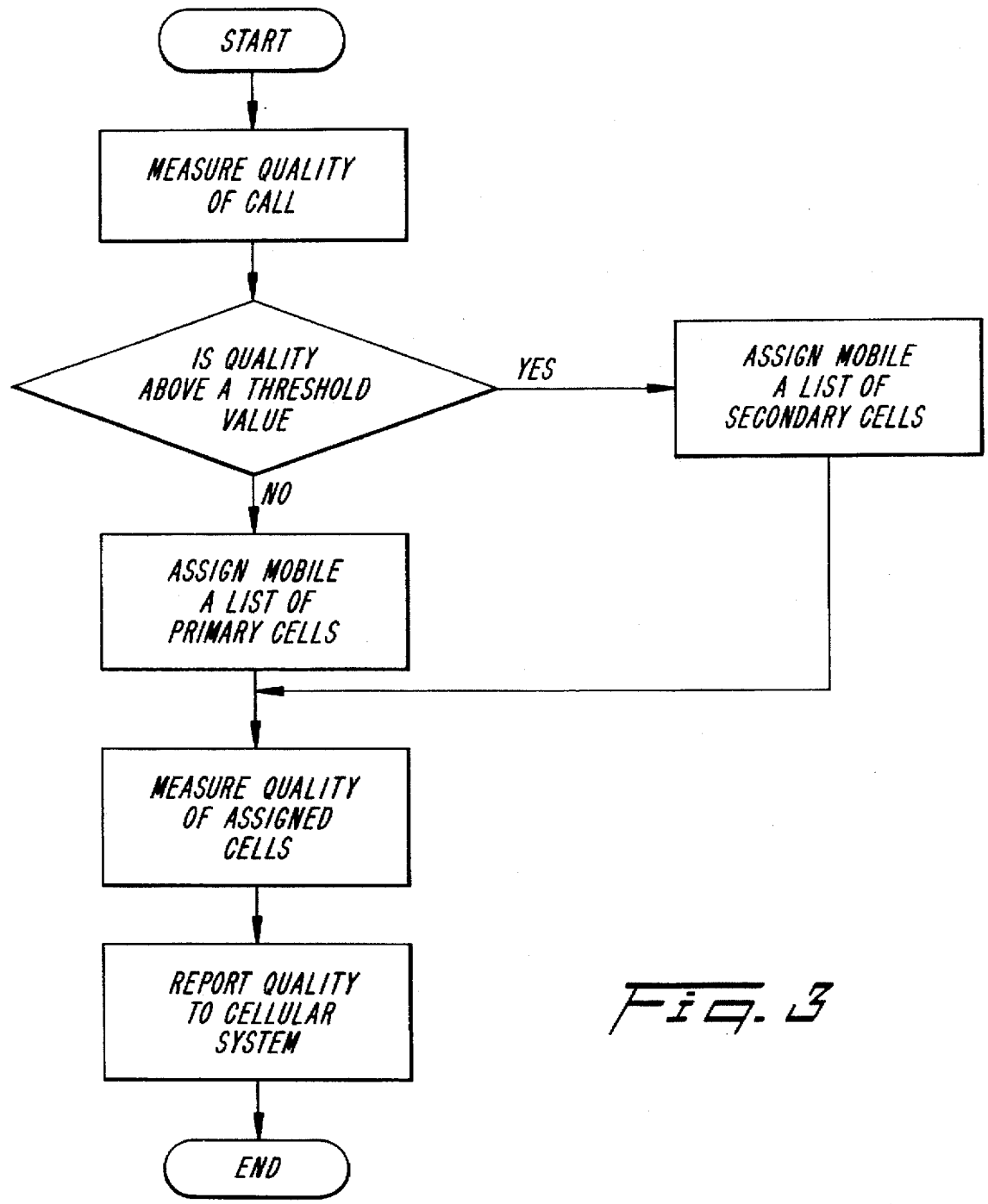

MOBILE ASSISTED HANDOFF

FIELD OF THE INVENTION

The present invention relates to a method for handing off a call in a mobile communication system, and in particular to a mobile assisted handoff method.

BACKGROUND OF THE DISCLOSURE

In prior mobile assisted handoff methods (MAHO), a mobile station normally measures the received signal strength of each neighboring cell the land system requires the mobile station to measure. In addition to the signal strength measurement, it is also often possible to request the mobile station to measure some cell characteristics, such as a color code or base station identification code transmitted by the carrier to which the mobile is required to measure the signal strength of. The outcome of these measurements are reported to the land system by means of data messages sent over an air interface.

However, there is normally a limitation on how many frequencies, i.e., cells, a mobile station can be requested to measure. Common maximum numbers are 12, 20, or 32. A decision on which channels to measure is normally transferred in a measurement order sent from the land system to the mobile station. The limitation is in most cases of minor importance. However, in dense urban areas, one umbrella cell may readily have 10–12 neighboring umbrella cells and with the introduction of micro cells where another 5–10 micro cells can be expected underneath the umbrella cell, the number of cells the mobile station can be ordered to measure becomes an annoying limitation. While systems with the possibility to measure on 20 or 32 channels may be less susceptible to these limitations, systems which can only measure 12 channels such as the U.S. IS-54B standard are influenced by these limitations and are not adapted for micro cell environments. In a newer standard IS-54C, the number of measurement channels can be extended up to 24 channels. But for all older versions of digital mobile stations, the 12 measurement channel limitation remains.

In a mixed umbrella-micro cell environment, there are different objectives as to why to measure the umbrella cells and the micro cells. The reason why mobile stations should measure neighboring umbrella cells is of course to detect if the mobile is leaving the cell it is presently using. Thus, the primary objective is uninterrupted service. Meanwhile, the reason for measuring micro cells is to determine if there is a micro cell that can serve the call instead of the umbrella cell. Thus, the objective is capacity. There is thus a need for balancing these objectives.

SUMMARY OF THE INVENTION

The present invention discloses a mobile assisted handoff method for use in the cellular communication system comprising a plurality of cells. First, the quality level of a cell a mobile station is presently using is measured to determine whether the quality level is above or below a threshold. If the quality level is below the threshold, a primary list of cells is assigned to the mobile station, whereas if the quality level is above the threshold, a secondary list of cells is assigned to the mobile station. The quality level of each of the assigned cells is then measured by the mobile station and reported to the communication system.

According to another embodiment of the present invention, a mobile station can be assigned a list of cells to measure wherein the list is divided into two sections, a steady section and an alternating section. The quality level of each assigned cell is measured and are regularly reported to the communication system. After a predetermined period of time, the cells in the alternating section are changed thus allowing the mobile station to measure a variety of cells. In addition, the list could also be divided into three sections, a fixed section, a steady section, and an alternating section.

According to another embodiment of the present invention, the quality levels of a plurality of cells are measured at a mobile station. The cells are then ranked by quality level and type and the cells are divided into two lists. The mobile station is then assigned some of the cells wherein the cells can be from either list or from both lists. The quality level of the assigned cells are regularly measured and reported to the land system for a handoff determination.

BRIEF DESCRIPTION OF THE DRAWINGS

These and other features and advantages of the present invention will be readily apparent to one of ordinary skill in the an from the following written description, used in conjunction with the drawings, in which:

FIG. 3 is a flow chart of a mobile assisted handoff method according to one embodiment of the present invention;

DETAILED DESCRIPTION OF THE PREFERRED EMBODIMENTS

Before describing the details of the present invention, an example of the construction of a cellular radio system in which the present invention can be used will be described.

Figure 1:
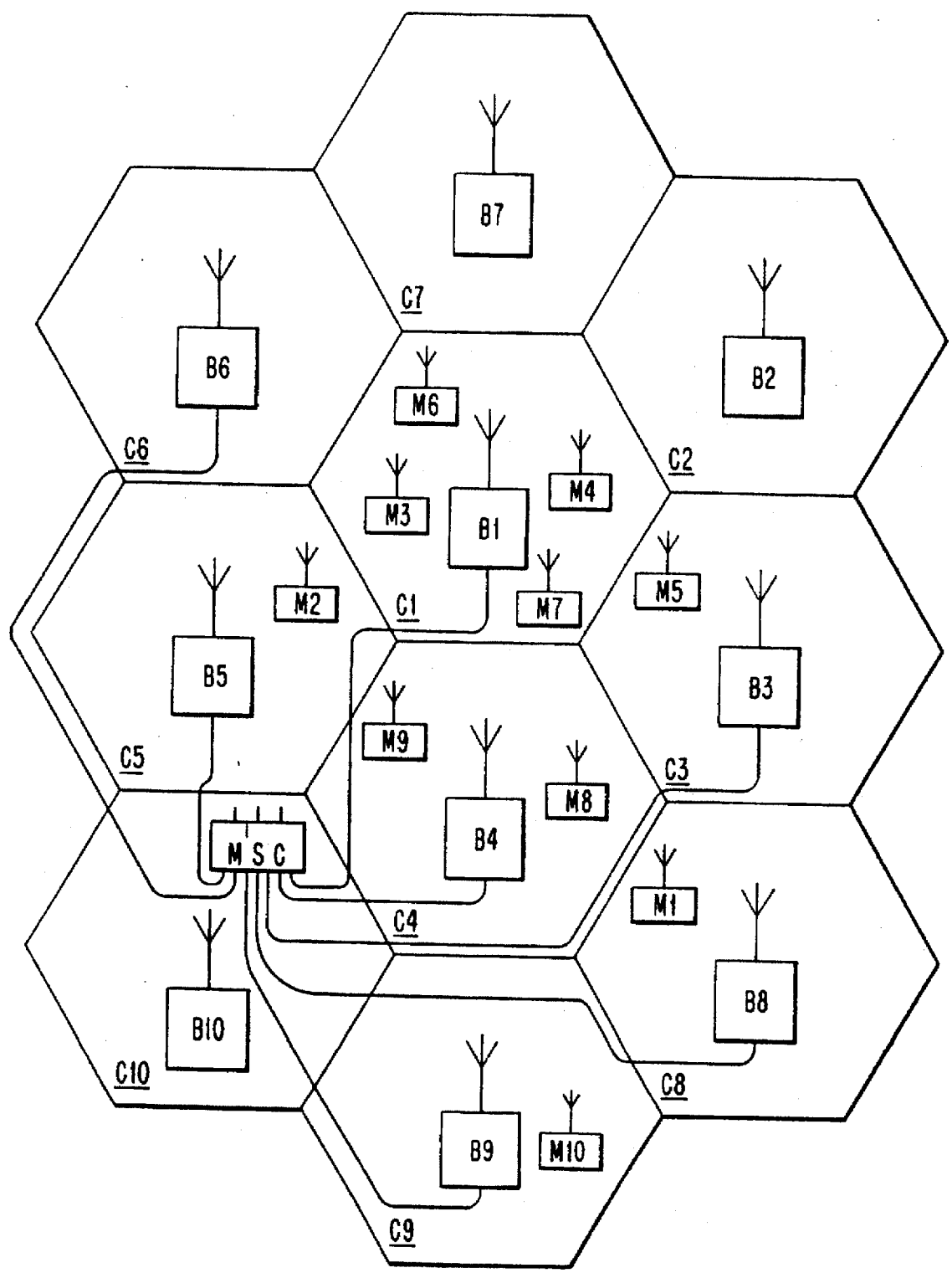
FIG. 1 is a representation of a cellular mobile radio system.

FIG. 1 is a schematic diagram illustrating 10 cells, C1–C10 in a cellular mobile radio telephone system. Normally, the method according to the present invention would be implemented in a cellular mobile radio system comprising more than 10 cells. However, for purposes of this description, the system depicted herein is considered to be an isolated portion of a larger system which has been fragmented.

For each cell C1–C10, there is a respective base station B1–B10. FIG. 1 illustrates base stations situated in the vicinity of the respective cell centers and having omnidirectional antennas. The base stations of adjacent cells may, however, be located in the vicinity of cell borders and have directional antennas.

FIG. 1 also illustrates ten mobile stations M1–M10 which are movable within a cell and from one cell to another. The method according to the present invention may be implemented in a cellular mobile radio system comprising many more than ten mobile stations. In particular, there are normally many more mobile stations than there are base stations. Also illustrated in FIG. 1 is a mobile switching center MSC. The mobile switching center MSC is connected to the illustrated base stations by cables. The mobile switching center is also connected by cables to a fixed public switching telephone network PSTN or similar fixed network with ISDN facilities. Not all cables from the mobile switching center to base stations and cables to the fixed network are illustrated. Further, other media may be used instead of cables for base to mobile switching center communications, e.g., fixed radio links.

The cellular mobile radio system illustrated in FIG. 1 includes a plurality of radio channels for communication. The system is designed for analog information, e.g., speech, digitized analog information, e.g., digitized speech, and pure digital information, e.g., pure digital dam. In the context of the present invention, the term connection is used for a communication channel between a mobile station and another mobile station in the same system or another system, between two fixed telephones or terminals in a fixed network connected through the cellular mobile radio telephone system, or between a mobile station and a fixed telephone.

Each cellular system is assigned a particular frequency band over which it can operate. A set of communication channels is allocated to each cell. For example, between ten to 30 different voice channels and one control channel may be allocated to any given cell. Different sets of communication channels must always be allocated to neighboring cells since, in order to maintain full radio coverage, cells overlap each other. Using the same channels in adjacent cells would cause co-channel interference in these overlapping areas.

Figure 2:
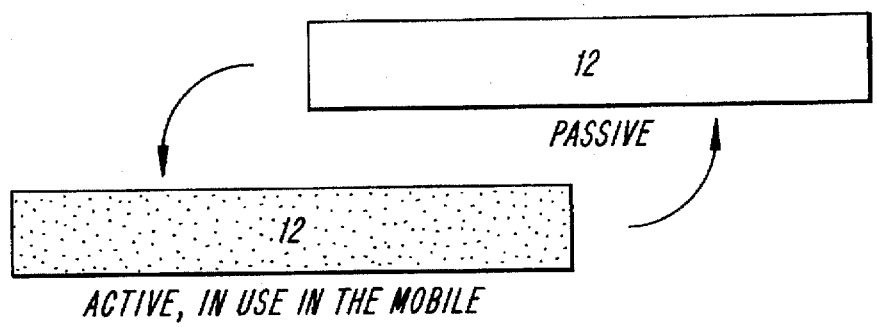
FIG. 2 is a block diagram illustrating several measurement lists according to one embodiment of the present invention.

According to one embodiment of the present invention, the mobile station can be assigned one of a plurality of lists as illustrated in FIG. 2. The mobile station can be assigned a first list of cells/frequencies to measure, wherein these cells are believed to be the most important cells to measure, e.g., surrounding umbrella cells. However, if the quality of the cells is good enough, it is assumed that the mobile station is well inside the umbrella cell it is presently using and does not require a handoff to another neighboring umbrella cell. As a result, the mobile station can be requested to measure the quality of other secondary cells which could be, for example, microcells. The quality measure could be signal strength, bit error rate and/or carrier to interference ratio. This embodiment is illustrated in the flow chart shown in FIG. 3. In step 100, the mobile station measures the quality of the ongoing call with the presently assigned cell. It is then determined in step 102 whether the quality is above a predetermined threshold value. If the quality is above the predetermined threshold value, the cellular system assigns the mobile station a secondary list of assigned cells in step 104. However, if the quality is not above the threshold value, the system assigns the mobile station a primary list of cells in step 106, wherein the primary list of cells are the most important neighboring cells. The quality of each of the assigned cells is then measured in step 108 and reported back to the cellular system in step 110 for further handoff determinations. Regularly, or if the quality of the connection drops, the mobile station may be requested to measure the signal strength of the primary list again even after it has been assigned a secondary list of cells to measure. Furthermore, if either or both of the primary and secondary lists contains less than 12 channels, the list can be padded with cells from other lists.

Figure 4:
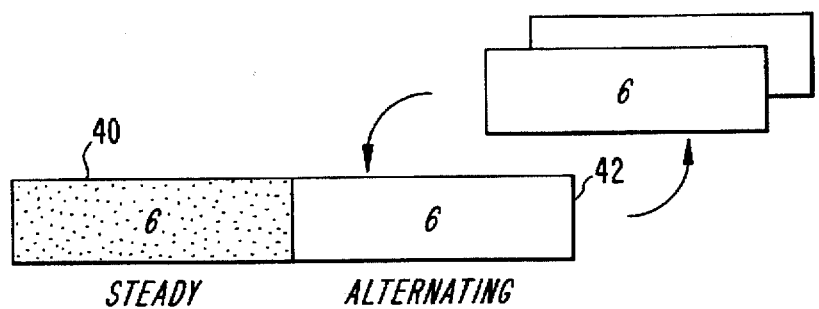
FIG. 4 is an illustration of a measurement list according to one embodiment of the present invention.

The previous embodiment is not ideal because the mobile station will at times not be able to listen to the most important neighboring cells. One way to overcome the above limitation is to send the mobile station a list of assigned cells, some of which are permanently assigned and some of which are alternating. For example, an umbrella cell may have six neighboring umbrella cells and 12 microcells in each umbrella cell. Hence, a mobile station which is only capable of measuring 12 channels cannot measure all of the neighboring cells and microcells at the same time. Since it is more important to guarantee uninterrupted service than temporary capacity improvements, all of the neighboring umbrella cells should be included in part of the measurement. According to one embodiment of the present invention, the list of assigned cells can be divided into two sections: a steady or fixed section 40 and an alternating section 42 as illustrated in FIG. 4. Referring again to the example described above, the six umbrella cells can be placed in the steady section 40 of the list, while six of the 12 microcells can be placed in the alternating section 42 of the list. If a good handoff candidate is not found, a new measurement order can be sent to the mobile which still includes the six neighboring umbrella cells in the steady section 40 of the list and the other six microcells in the alternating section 42 of the list. This process can continue throughout the call.

With more cells, more lists can be created and the mobile station will be requested to measure on these lists as well. The sizes of the steady and alternating sections of the lists need not be fixed and can vary from cell to cell. The selection of which cells go in the steady section and which cells go into the alternating section can be predetermined based on previous experience or the selection can be dynamically decided.

According to another embodiment of the present invention, all primary neighboring cells can be ranked from best or most important down to the least important cell. Likewise, the secondary neighboring cells can be ranked from best to worst. The contents and order of the lists can either be fixed or based on prior knowledge or be based on the current environment. For example, by studying a handoff pattern for a particular cell A, it may be possible to statistically show that 87% of all handoffs are made to four neighboring cells, 9% are made to three other neighboring cells and the remaining 4% of the handoffs are made to the remaining three neighboring cells. From such data, it would be easy to rank the cells in order of importance. However, the present invention is not limited to the above-described example.

Figure 5:
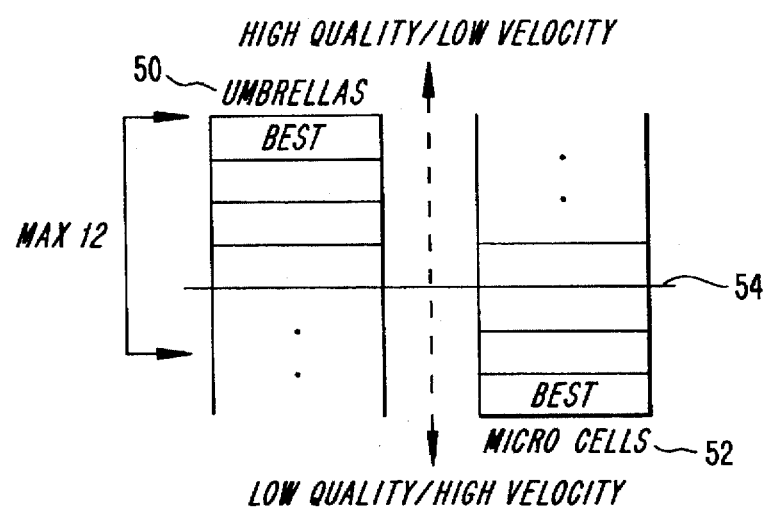
FIG. 5 illustrates a mobile assisted handoff method according to another embodiment of the present invention.

The example illustrated in FIG. 5 indicates that a maximum of 12 channels can be measured simultaneously. The number of primary cells or umbrella cells 50 and the number of secondary cells or microcells 52 listed in the measurement order can vary depending upon the quality of the existing call. The higher the quality, the more secondary cells that can be included in the measurement order. Likewise, when the quality is lower, more primary cells should be included in the measurement order. This is illustrated by the horizontal bar 54 in FIG. 5. As usual, the quality can be measured in quantities of signal strength, bit error rate or carrier/interference ratio.

It is also possible to vary the mix of umbrella cells and microcells depending upon the velocity of the mobile station. The velocity of the mobile station can be estimated by measuring the fading frequency of a received signal from the mobile station in the land system in a known manner. It would be desirable to let a fast moving mobile station monitor more of the neighboring umbrella cells than the local microcells. In addition, it is also possible to decide the makeup of the measurement order based upon both quality and velocity.

A further embodiment of the above-described techniques is to perform a full locating of the mobile station and let the locating result determine which cells are listed in the measurement order. Locating the mobile station involves the steps of collecting signal strengths from neighboring cells, comparing these against minimum level thresholds and adding various hysteresis and offset and maybe even further manipulation in processing. After the processing of the measurement data, if a neighboring cell shows a better signal strength than the current cell, a handoff to this other cell is normally initiated. In addition, other criteria may also be considered before deciding whether a handoff is necessary, such as connection quality, bit error rate, carrier to interference ratio, etc.

Figure 6:
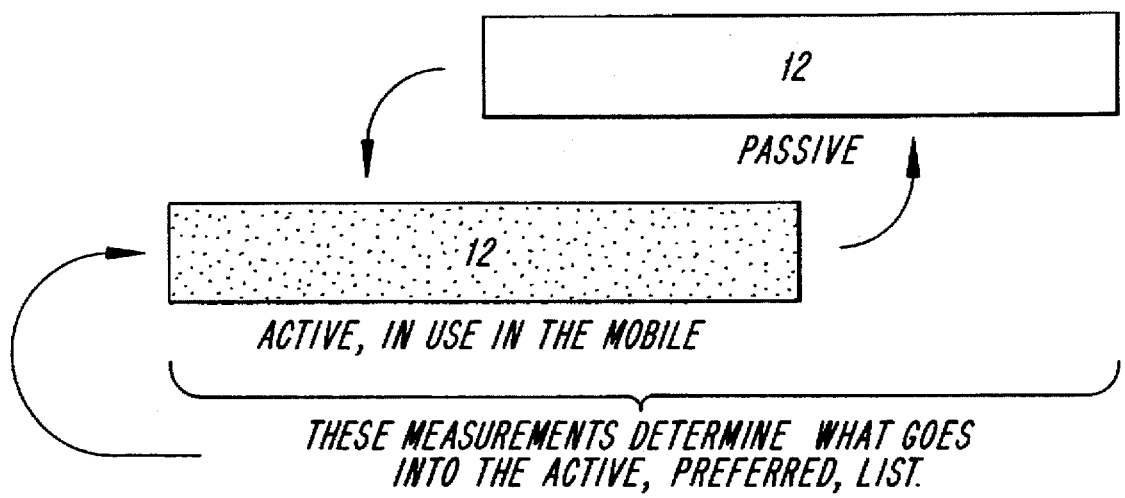
FIG. 6 is a block diagram illustrating several measurement lists according to another embodiment of the present invention.

According to one embodiment of the present invention, the mobile station is ordered to take quality measurements of up to 12 cells for a predetermined period of time. The mobile station then takes measurements of an additional set or sets of other cells. A locating evaluation is then performed and the 12 strongest/best cells are selected. The locating evaluation might compare received signal strengths or quality levels which have been adjusted by an offset value, wherein the offset value can be used to favor certain base stations. These channels are measured for a predefined time. Then, the 12 channels are swapped for 12 other channels to be evaluated if any of these channels have become the better handoff candidate than the cells in the top 12 list as illustrated in FIG. 6. The secondary list is measured for a shorter period of time than the primary list and then the mobile station begins to measure the quality of the 12 strongest/best cells once again. It is important to note that this primary list may be different from the previous primary list since the 12 strongest/best cells may have changed over time.

Figure 7:
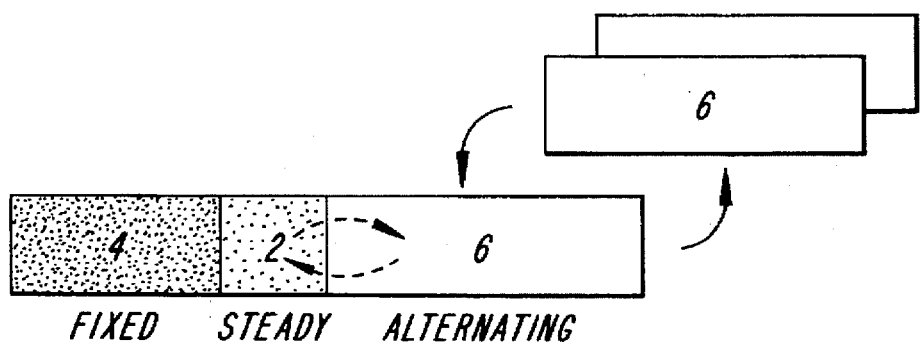
FIG. 7 is a block diagram of a measurement list according to one embodiment of the present invention.

In another embodiment of the present invention, rather than alternating between groups of 12 channels, the list of selected cells can be divided into a plurality of sections, for example, a steady and alternating section. In this embodiment, if a cell in the alternating part is considered to be a better cell than a cell in the steady section, that cell may be inserted into the steady section and the lowest ranked cell in the steady section is then transferred to the alternating section. Furthermore, in some cases, it may be vital to constantly measure some of the neighboring cells. As a result, the list of cells can be divided into three sections containing a fixed section, a steady section and an alternating section as illustrated in FIG. 7. Thus, some cells can be placed in the fixed section and therefore measured every time. Cells in the steady section would also be measured every time as long as they qualify for this section, whereas cells that only qualify for the alternating section will not always be monitored.

It will be appreciated by those of ordinary skill in the art that the present invention can be embodied in other specific forms without departing from the spirit or essential character thereof. The presently disclosed embodiments are therefore considered in all respects to illustrative and not restrictive. The scope of the invention is indicated by the appended claims rather than the foregoing description, and all changes which come within the meaning and range of equivalence thereof are intended to embraced therein.

We claim:

1. A method of mobile assisted handoff in a cellular communication system comprising a plurality of mobile stations and a land system and a plurality of cells, comprising the steps of:

assigning a mobile station a list of cells to measure, wherein said list is divided into two sections, a steady section and an alternating section;

measuring quality level of each assigned cell;

reporting said quality levels to said land system;

transferring a cell from the alternating section of the list to the steady section of the list when said cell has a quality level higher than one of the cells in the steady section, wherein the cell with the lowest quality level in the steady section is transferred to said alternating section; and changing said cells listed in said alternating section every predetermined period of time.

2. A mobile assisted handoff method according to claim 1, wherein said quality level is determined by signal strength.

3. A mobile assisted handoff method according to claim 1, wherein said quality level is determined by a bit error rate.

4. A mobile assisted handoff method according to claim 1, wherein said quality level is determined by a carrier/interference ratio.

5. A mobile assisted handoff method according to claim 1, wherein said quality levels are adjusted according to precalculated compensation levels.

6. A method of mobile assisted handoff in a cellular communication system comprising a plurality of mobile stations and a land system and a plurality of cells, comprising the steps of:

assigning a mobile station a list of cells to measure, wherein said list is divided into two sections, a steady section and an alternating section;

measuring quality level of each assigned cell;

reporting said quality levels to said land system;

transferring a cell from the alternating section of the list to the steady section of the list when said cell has an adjusted quality level higher than one of the cells in the steady section, wherein the cell with the lowest adjusted quality level in the steady section is transferred to said alternating section; and changing said cells listed in said alternating section every predetermined period of time.

7. A mobile assisted handoff method according to claim 6, wherein said quality level is determined by signal strength.

8. A mobile assisted handoff method according to claim 6, wherein said quality level is determined by a bit error rate.

9. A mobile assisted handoff method according to claim 6, wherein said quality level is determined by a carrier/interference ratio.

10. A mobile assisted handoff method according to claim 6, wherein said quality levels are adjusted according to precalculated compensation levels.

11. A method of mobile assisted handoff in a cellular communication system comprising a plurality of mobile stations and a land system and a plurality of cells, comprising the steps of:

assigning a mobile station a list of cells to measure, wherein said list is divided into three sections, a fixed section, a steady section, and an alternating section, said fixed section containing cells which are always measured;

measuring quality level of each assigned cell;

reporting said quality levels to said land system;

transferring a cell from the alternating section of the list to the steady section of the list when said cell has a quality level higher than one of the cells in the steady section, wherein the cell with the lowest quality level in the steady section is transferred to said alternating section; and changing said cells listed in said alternating section every predetermined period of time.

12. A mobile assisted handoff method according to claim 11, wherein said quality level is determined by signal strength.

13. A mobile assisted handoff method according to claim 11, wherein said quality level is determined by a bit error rate.

14. A mobile assisted handoff method according to claim 11, wherein said quality level is determined by a carrier/interference ratio.

15. A mobile assisted handoff method according to claim 11, wherein said quality levels are adjusted according to precalculated compensation levels.

16. A method of mobile assisted handoff in a cellular communication system comprising a plurality of mobile stations and a land system and a plurality of cells, comprising the steps of:

assigning a mobile station a list of cells to measure, wherein said list is divided into three sections, a fixed section, a steady section, and an alternating section, said fixed section containing cells which are always measured;

measuring quality level of each assigned cell;

reporting said quality levels to said land system;

transferring a cell from the alternating section of the list to the steady section of the list when said cell has an adjusted quality level higher than one of the cells in the steady section, wherein the cell with the lowest adjusted quality level in the steady section is transferred to said alternating section; and changing said cells listed in said alternating section every predetermined period of time.

17. A mobile assisted handoff method according to claim 16, wherein said quality level is determined by signal strength.

18. A mobile assisted handoff method according to claim 16, wherein said quality level is determined by a bit error rate.

19. A mobile assisted handoff method according to claim 16, wherein said quality level is determined by a carrier/interference ratio.

20. A mobile assisted handoff method according to claim 16, wherein said quality levels are adjusted according to precalculated compensation levels.

21. A communications system with mobile assisted handoff comprising a plurality of mobile stations and a land system and a plurality of cells, comprising:

means for assigning a mobile station a list of cells to measure, wherein said list is divided into two sections, a steady section and an alternating section;

means for measuring quality level of each assigned cell;

means for reporting the quality levels to said land system;

means for transferring a cell from the alternating section of the list to the steady section of the list when said cell has a quality level higher than one of the cells in the steady section, wherein the cell with the lowest quality level in the steady section is transferred to said alternating section; and means for changing said cells listed in said alternating section every predetermined period of time.

22. A communications system according to claim 21, wherein said quality level is determined by signal strength.

23. A communications system according to claim 21, wherein said quality level is determined by a bit error rate.

24. A communications system according to claim 21, wherein said quality level is determined by a carrier/interface ratio.

25. A communications system according to claim 21, wherein said quality levels are adjusted according to precalculated compensation levels.

* * * * *